(12) United States Patent
Gage et al.

(10) Patent No.: US 9,246,902 B1
(45) Date of Patent: Jan. 26, 2016

(54) DEVICE-AGNOSTIC USER AUTHENTICATION

(71) Applicants: John Gage, Norfolk, MA (US); Alain Slak, Bedford, MA (US); David M. T. Ting, Sudbury, MA (US)

(72) Inventors: John Gage, Norfolk, MA (US); Alain Slak, Bedford, MA (US); David M. T. Ting, Sudbury, MA (US)

(73) Assignee: Imprivata, Inc., Lexington, MA (US)

( * ) Notice: Subject to any disclaimer, the term of this patent is extended or adjusted under 35 U.S.C. 154(b) by 0 days.

(21) Appl. No.: 14/321,321

(22) Filed: Jul. 1, 2014

(51) Int. Cl.
| | | |
|---|---|---|
| *G06F 7/04* | (2006.01) | |
| *G06F 15/16* | (2006.01) | |
| *G06F 17/30* | (2006.01) | |
| *H04L 29/06* | (2006.01) | |
| *G06F 21/31* | (2013.01) | |
| *H04L 29/08* | (2006.01) | |

(52) U.S. Cl.
CPC ............... *H04L 63/08* (2013.01); *G06F 21/31* (2013.01); *H04L 63/083* (2013.01); *H04L 63/0884* (2013.01); *H04L 67/02* (2013.01)

(58) Field of Classification Search
CPC ................................ H04L 63/08; G06F 21/31
USPC ............................................................ 726/7
See application file for complete search history.

(56) References Cited

U.S. PATENT DOCUMENTS

| | | | |
|---|---|---|---|
| 2013/0324086 A1* | 12/2013 | Celi et al. ................ | 455/411 |
| 2014/0282976 A1* | 9/2014 | Holmelin et al. ........... | 726/7 |
| 2015/0020148 A1* | 1/2015 | Greenbaum et al. ........ | 726/1 |

OTHER PUBLICATIONS

Rajkumar Buyya; InterCloud: Utility-Oriented Federation of Cloud Computing Environments for Scaling of Application Services; Year:2010; The University of Melbourne, p. 1-20.*

* cited by examiner

*Primary Examiner* — Monjour Rahim

(74) *Attorney, Agent, or Firm* — Morgan, Lewis & Bockius LLP

(57) ABSTRACT

A user of a client device that executes a remote application is authenticated by first receiving an HTTP or HTTPS request to authenticate the user from the remote application. The user is prompted for authentication information, and authentication information is obtained by communicating with a hardware device in electronic communication with the client device. The user's authorization to use the remote application is then verified using a computer processor and using the authentication information.

11 Claims, 3 Drawing Sheets

DEVICE-AGNOSTIC USER AUTHENTICATION

TECHNICAL FIELD

Embodiments of the present invention relate generally to authentication and, more specifically, to authenticating a user of a client device executing a remote application.

BACKGROUND

Remote or externally hosted applications, such as web-based applications, may be deployed and executed on local client devices via the use of web browsers or other local client software. Frequently, a user of the client device is required to authenticate himself or herself before using the remote application in accordance with the security policy of the organization, company, or network of which the user is a member, the security policy of the remote application provider, or other security policy. This authentication may include supplying a username and password, interacting with a biometric scanner or a fingerprint reader, and/or authentication in some other manner. Authentication is particularly stringent for applications involving the exchange of sensitive or confidential information.

In conventional systems, the remote application typically collects authentication information. In the case of a username/password process, the remote application may, for example, present a dialog box prompting the user for this information and verify the received username and password against a secure list. In the case of device-based authentication (e.g., a fingerprint reader), the remote application includes software to interact with and operate the device (to, e.g., activate it, receive the scanned user fingerprint data, and either verify the received fingerprint data against known fingerprint data or transmit it to an authentication server). Often, for security reasons, the software used to interact with the hardware device is a browser plug-in.

Security policies may vary greatly depending on the nature of the application and the policies of an organization; some may require only a username/password, while others require the use of hardware authentication devices. This variation, in addition to the complexity in interfacing with different makes, models, and types of hardware authentication devices, places a burden on developers of remote applications to create the necessary authentication software. Furthermore, because the interface software is usually in the form of a browser plug-in (or similar construct), the software may further vary across different web-browser types or versions The difficulty in designing and maintaining these plug-ins may create operability problems, bugs, or security holes in the use of the remote application on the local client, in particular when the remote application attempts to control a local resource in order to, for example, facilitate user authentication. A need therefore exists for a simpler and more secure method for managing secure access to remote applications when the remote application interacts with local resources.

SUMMARY

Embodiments of the present invention include an authentication-request handler, local to a client device, that executes instructions for collecting authentication information from a user of the device. The authentication-request handler executes with permissions or at a security level sufficient to perform the information collection by, for example, drawing a window on the screen of the client device and prompting for a username and password, or by communicating with a hardware authentication device (e.g., a fingerprint reader, biometric scanner, proximity card reader, or smart card reader); a remote application (e.g., a web-based application), by contrast, lacks such permissions.

In one aspect, a method for authenticating a user of a client device executing a remote application includes electronically receiving, from the remote application, an HTTP or HTTPS request to authenticate the user; prompting the user for authentication information; communicating with a hardware device in electronic communication with the client device to obtain the authentication information; and verifying, using a computer processor and the authentication information, that the user is authorized to use the remote application.

The step of verifying may be performed by the remote application or by an authorization server; an HTTP or HTTPS message confirming authentication of the user may be electronically sent to the remote application. Prompting the user for the authentication information may include creating a window on a local display prompting for a password or activating a hardware authentication device.

In another aspect, a method for authenticating a user of a client device executing a remote application includes electronically receiving, from the remote application, a request to authenticate the user, the request specifying a type or level of authentication; activating a client modality for obtaining authentication information in a manner consistent with the request; prompting the user to provide authentication information to the activated modality; and electronically communicating the obtained information to the remote application.

The modality may be hardware device or a window drawn on a display of the client and prompting the user for a password. The request may specify the modality or an authentication level, wherein the activated modality is consistent with the specified level.

In another aspect, a system for authenticating a user of a client device executing a remote application includes a client device comprising a computer processor for executing software instructions of a remote application and of an authorization-request handler, the instructions of the authorization-request handler comprising: electronically receiving, from the remote application, a request to authenticate the user; prompting the user for authentication information in a manner consistent with the request; and communicating with a hardware device in electronic communication with the client device to obtain the authentication information. The system also includes a database of authentication data to which the authentication information is compared to verify that the user is authorized to use the remote application. The remote application may compare the authentication information to the database of authentication data. The database may be part of or accessible to the client and/or part of or accessible to a server hosting the remote application. An authorization server may compare the authentication information to the database of authentication data.

These and other objects, along with advantages and features of the present invention herein disclosed, will become more apparent through reference to the following description, the accompanying drawings, and the claims. Furthermore, it is to be understood that the features of the various embodiments described herein are not mutually exclusive and can exist in various combinations and permutations.

BRIEF DESCRIPTION OF THE DRAWINGS

In the drawings, like reference characters generally refer to the same parts throughout the different views. In the following description, various embodiments of the present invention are described with reference to the following drawings, in which.

DETAILED DESCRIPTION

An authentication-request handler, running on a client device, executes instructions for collecting authentication information from a user of the device. An authentication request may be triggered by a user (by, for example, opening an application or selecting a "log in" button or link), by the application (if, for example, a certain amount of wall-clock time or user idle time has elapsed), and/or by other means (such as, for example, by monitoring the proximity of the user or others to the client device). If and when authentication is required, the application or server sends a request to the authentication-request handler and awaits a response.

The authentication-request handler receives the request and collects the information via username/password entry (e.g., by generating an on-screen window with a prompt) and/or a hardware authentication device. Once the information is collected, the authentication-request handler sends it to the remote application or to an authentication server. Thus, the authentication-request handler permits the remote application to authenticate a user without actually executing the instructions pertaining to the collection of the authentication information. As a result, the remote application need not direct or even "know" exactly how authentication information is collected; so long as the information it receives is verified and obtained via a modality consistent with a security policy (if any) that it implements, the mechanics of collecting authentication information is left to functionality executing on the client. This, in turn, makes the remote application compatible with a broad range of clients having varying capabilities and hardware resources without sacrificing security.

Figure 1:
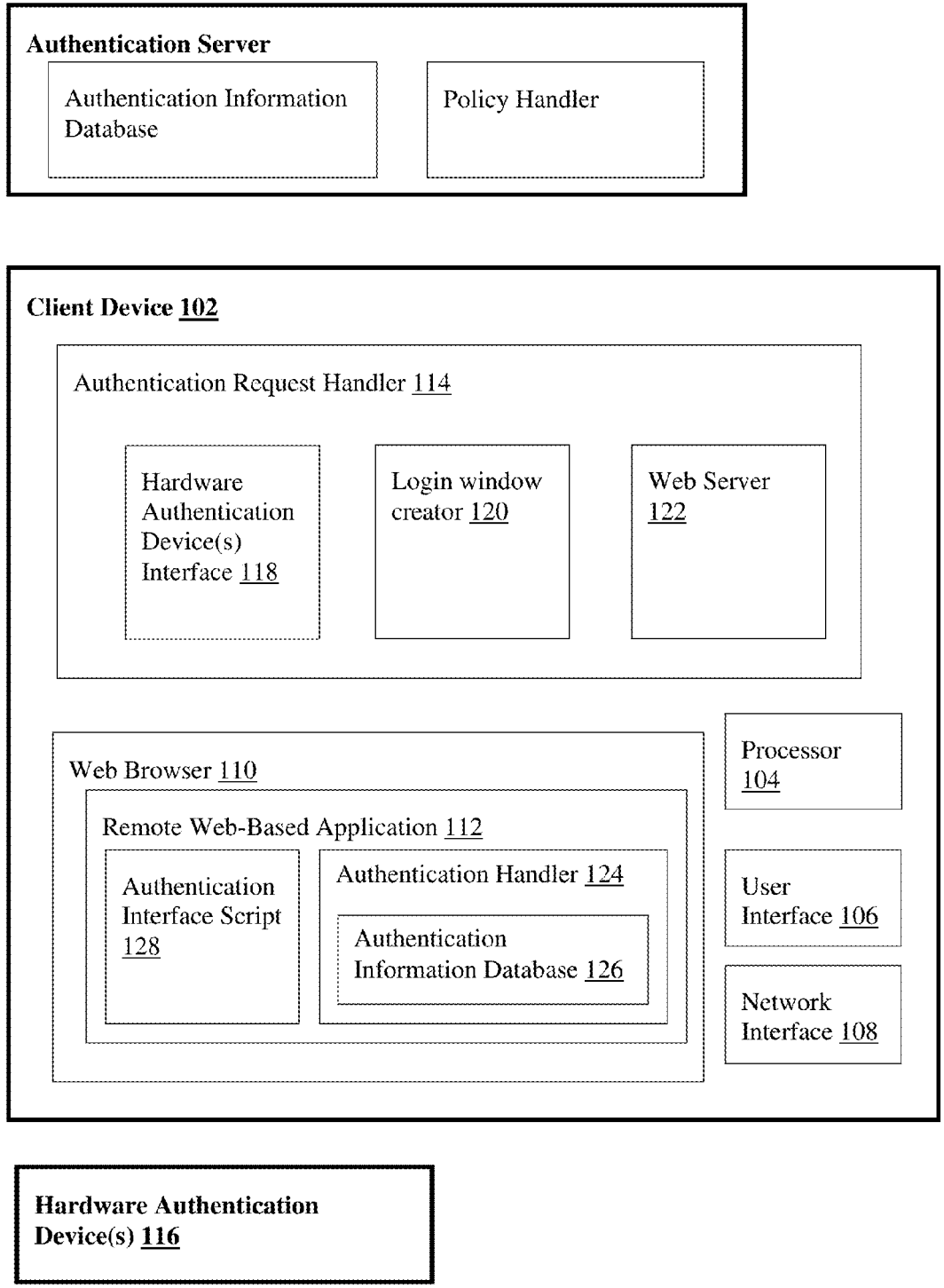
FIG. 1 is a block diagram of a system for authentication in accordance with embodiments of the present invention.

FIG. 1 illustrates a client device 102 in accordance with embodiments of the present invention. The client device 102 may be a desktop computer, laptop or portable computer, tablet computer, smartphone, or any other type of similar device and includes a computer memory (e.g., RAM) for storing instructions and data, a processor 104 (e.g., INTEL XEON) for executing instructions, a network interface 106 (e.g., ETHERNET or WI-FI) for communication with a remote application or other devices/applications, a user interface 108 (e.g., a display/touchscreen, keyboard, mouse, or similar devices), and storage (e.g., flash memory or a solid-state or magnetic disk). The figure further illustrates a web browser 110 running a remote web-based application 112. One of skill in the art will understand, however, that embodiments of the present invention are not limited to only the use of browser-based applications and that authentication using any locally executing remote application is within the scope of the current invention.

The below figure further includes, in accordance with embodiments of the present invention, an authentication-request handler program 114 or program module. The authentication-request handler 114 may include software instructions written in C, C++, Java, or any other programming language and may be stored in non-volatile storage and/or RAM and executed using the processor. The authentication-request handler 114 may run using a set of permissions and privileges on the client device that allows it access to the user interface 106 and/or hardware-authentication device(s) 116; this set of permissions may correspond to user-level privileges, administrator or root privileges, or a custom set of privileges.

The authentication-request handler 114 may include one or more hardware-authentication device interfaces 118 connected to or otherwise communicating with the client device 102. A given hardware-authentication device 116 (e.g., a thumbprint reader) may require a specific set of software instructions and protocols in order to communicate with the client device; such instructions may take the form of a device driver, handshaking protocol, plug-and-play protocol, or similar instructions. In one embodiment, the hardware-authentication device 116 interface includes all such software instructions necessary for this communication. In other embodiments, the hardware-authentication device interface 118 contains a portion of the software, and other software (such as device drivers or another executable program used to communicate with the hardware-authentication device 116) resides elsewhere on the client device. For example, a certain hardware-authentication device 116 may require the installation of a proprietary, closed-source device driver and communication program; the hardware-authentication device interface 118 may then communicate with the device driver and/or communication program via an API.

The authentication-request handler 114 may further include a login-window creator 120 for displaying a login window on the screen of the client device. The login window may be integrated with the window displaying the remote application 112 and (e.g.) use similar window decorations or may be a stand-alone window decorated by the operating system. The login-window creator 120 may disable and/or obscure some or all of the remote-application window (and/or other windows, or the entire desktop) while the user is being authenticated. Instead or in addition, a web server 122 (as explained in greater detail below) may host a web page that may be loaded as a subview of a page of the web-based application and that prompts for the username and password.

The authentication-request handler 114 may further include the web server 122. The web 122 server may be, for example, the APACHE web server provided by the APACHE SOFTWARE FOUNDATION, or any other similar server; it may, however, be modified to have a lower memory footprint or processor load requirement than a typical APACHE (or other) server by removing functionality not required by embodiments of the present invention. The web server 122 may be used to communicate with the web browser 110 and, specifically, the remote web-based application 112 executing via the browser. In one embodiment, when the web-based application 112 requires the user to be authenticated, it sends a message requesting authentication to the web server 122. The web server 122 communicates with the hardware-authentication device interface 118 and/or login-window creator 120 to prompt for authentication information from the user. As mentioned above, the authentication information may be a username and password, a fingerprint, and/or biometric information from the user.

Depending on the security policy implemented by the web-based application 112, the authentication request may specify one or more acceptable types of authentication information (e.g., password or fingerprint), in which case the web server 122 selects the most appropriate authentication modality from among those available on the client device. When more than one acceptable modality is available, the selection may, for example, be based on user convenience. In other embodiments, the authentication request may specify an authentication level rather than a type of authentication, and the web server 122 selects an authentication modality consistent with the specified level.

The present invention is not, however, limited to only web-based applications and web servers. In other embodiments, other remote applications use other types of mechanisms and software to provide a display window on a client device, such as the X WINDOW SYSTEM, CITRIX RECEIVER, MICROSOFT WINDOWS REMOTE DESKTOP, or any other such system or protocol. In these embodiments, a different communications program appropriate for a given protocol may be used in place of the web server.

When the authentication information is received, the user may be authenticated in any a variety of ways, all of which are within the scope of the present invention. In one embodiment, the authentication-request handler 114 sends the collected authentication information to the web-based application 112, which includes an authentication handler 124 and database 126 of authentication information. For example, the password may be compared against a list of passwords associated with the user, or the fingerprint may be compared against a previously collected fingerprint of the user.

In another embodiment, an authentication server, such as the ONESIGN server provided by Imprivata, Inc., Lexington, Mass., may be used to authenticate the user by comparing the received information against a database of authentication information. The authentication information may be sent to the authentication server directly from the authentication-request handler or indirectly via the web-based application. The authentication server may execute on a separate remote or local device or server or may execute on the client device. In one embodiment, a given network or site shares a single (or low number) of authentication servers with a plurality of client devices.

In one embodiment, the web-based application includes an authentication-interface script 128 for facilitating communication with the web server 122. The script may include commands or functions for sending a request for authentication to the web server 122, for querying the web server 122 regarding the status of an authentication attempt, for forwarding the request to the authentication server, or for sending information regarding the user, type or name of the web-based application 112, time of authentication attempt, or other such information to the web server 122 or authentication server. In one embodiment, the script 128 is a JAVASCRIPT library or JAR file and may be included in one or more web pages displayed using the web-based application 112. The script 128 may include a function named SendAuthenticationRequest(<user>,<IP>), for example, where <user> is the name or username of the user and <IP> is the IP address of the web server. When authentication is required, the web-based application 112 may call this function with the appropriate parameters. The web server 122 may monitor requests on an incoming IP address or port; the requests may be HTTP or HTTPS requests or other similar types of requests.

Figure 2:
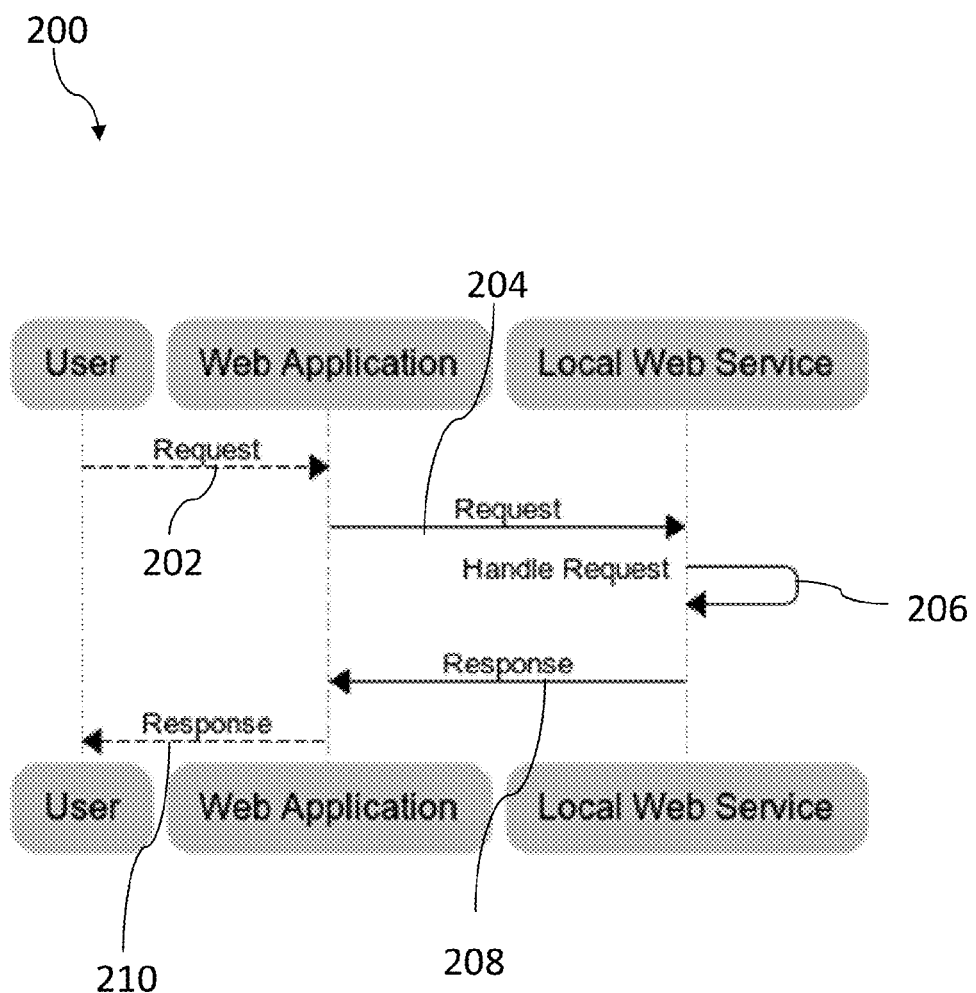
FIG. 2 is a flowchart of an authentication process in accordance with embodiments of the present invention.

FIG. 2 illustrates an example of a workflow 200 in accordance with embodiments of the present invention. In a first step 202, a user requests authentication from the web-based application; this request may be, for example, a request to authenticate the user with a fingerprint. Alternatively, as mentioned above, the web-based application or authentication server may initiate the request. In a second step 204, the web-based application sends a service request to the web server requesting that it perform the authentication. In a third step 206, the web server services the request by, for example, displaying a username/login screen and/or calling the appropriate native code to interact with a hardware authentication device. When the username and password have been entered and/or the device has completed the action, in a fourth step 208, the web server responds to the web-based application by sending the collected information (e.g., a captured fingerprint). In a fifth step 210, the web-based application verifies the identity of the user using the received information.

Figure 3:
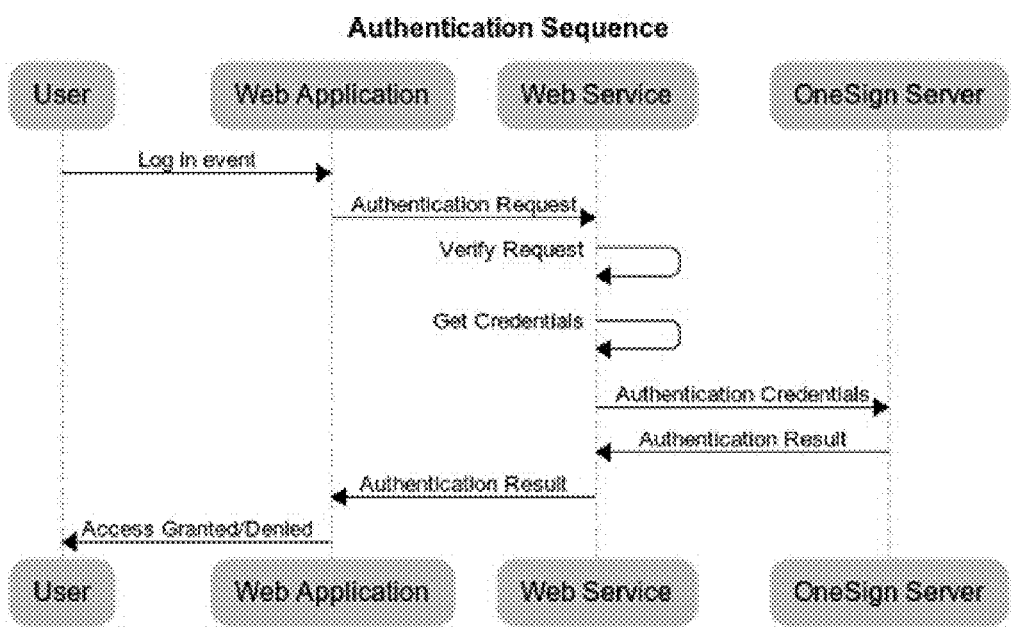
FIG. 3 is a flowchart of another authentication process in accordance with embodiments of the present invention.

Another workflow example 300 appears in FIG. 3. In this example, an authentication server is used to authenticate the user. Instead of the web-based application performing the authentication, it forwards the information received from the web server to the authentication server. Once the user is authenticated, the authentication server sends an indication thereof back to the web-based application. As mentioned above, the authentication server may be used to authenticate a plurality of users in a plurality of web-based applications.

In various embodiments of the present invention, authentication requests, authentication grants, or authentication information may be verified upon receipt by the web server, web-based application, and/or authentication server. For example, when the web server receives an authentication request from the web-based application, it may verify that it originated from a valid source by, e.g., verifying that the request was generated on the client device, verifying that the request includes a supported vendor ID, and/or verifying that the request is signed by a particular key.

The authentication server may further include a policy handler for implementing security policies for users or applications. In a simple scenario, the policy handler specifies that all users are required to enter their usernames and passwords upon booting a web-based application. The policy handler may vary the policy for different users, however: certain users may be required to also authenticate using a hardware device or at more frequent times, for example. Similarly, the policy handler may specify that certain applications require different authentication procedures or frequencies. The policy handler may further allow different levels of authentication for the same user using the same application; if, for example, a user has already been authenticated using a more-stringent form of authentication (username, password, and fingerprint, for example), a subsequent authentication may require a less-stringent form (only username and password, for example) if less than a certain amount of time has passed since the first login (one hour, perhaps) or if the user's presence within the facility where the client is located has been verified by other means (e.g., an access-control system).

The web server may be used by the web-based application to communicate with other peripherals of the client device than the hardware-based authentication devices, particularly other peripherals that would otherwise require the use of a browser plug-in. Authentication of the user may or may not first be required before use of these other peripherals. The use of a web cam by a web-based application, for example, typically requires the use of a web-cam plug-in; instead, the web-based application may access the web cam via the web server, which may then communicate with the web cam. In this embodiment, in addition to the transmitting of authentication requests and information, the web server may also transmit or stream data (e.g., video data).

Instead or in addition, the web server may be used by the web-based application to access peripherals even if they would not otherwise require a browser plug-in, such as (for example) printers, scanners, or faxes. In these embodiments, the web-based application is able to access these otherwise-available peripherals only if the user is authenticated and/or if the user approves, thus providing a layer of security between the web-based application and the peripherals that would otherwise be missing.

It should also be noted that embodiments of the present invention may be provided as one or more computer-readable programs embodied on or in one or more articles of manufacture. The article of manufacture may be any suitable hardware apparatus, such as, for example, a floppy disk, a hard disk, a CD ROM, a CD-RW, a CD-R, a DVD ROM, a DVD-RW, a DVD-R, a flash memory card, a PROM, a RAM, a ROM, or a magnetic tape. In general, the computer-readable programs may be implemented in any programming language. Some examples of languages that may be used include C, C++, or JAVA. The software programs may be further translated into machine language or virtual machine instructions and stored in a program file in that form. The program file may then be stored on or in one or more of the articles of manufacture.

Certain embodiments of the present invention were described above. It is, however, expressly noted that the present invention is not limited to those embodiments, but rather the intention is that additions and modifications to what was expressly described herein are also included within the scope of the invention. Moreover, it is to be understood that the features of the various embodiments described herein were not mutually exclusive and can exist in various combinations and permutations, even if such combinations or permutations were not made express herein, without departing from the spirit and scope of the invention. In fact, variations, modifications, and other implementations of what was described herein will occur to those of ordinary skill in the art without departing from the spirit and the scope of the invention. As such, the invention is not to be defined only by the preceding illustrative description.

What is claimed is:

1. A method for authenticating a user of a client device executing a remote application, the method comprising:
   electronically receiving with an authentication-request handler local to the client device, from the remote application, an HTTP or HTTPS request to authenticate the user;
   with the handler, prompting the user for authentication information and activating a hardware device in electronic communication with the client device;
   with the handler, communicating with the hardware device to obtain the authentication information, wherein the remote application lacks permission to communicate with the hardware device; and
   verifying, using a computer processor and the authentication information, that the user is authorized to use the remote application.

2. The method of claim 1, wherein the step of verifying is performed by the remote application.

3. The method of claim 1, wherein the step of verifying is performed by an authorization server and further comprising electronically sending, to the remote application, an HTTP or HTTPS message confirming authentication of the user.

4. The method of claim 1, wherein prompting the user for authentication information further comprises creating a window on a local display prompting for a password.

5. A method for authenticating a user of a client device executing a remote application, the method comprising, at the client device:
   electronically receiving with an authentication-request handler local to the client device, from the remote application, a request to authenticate the user, the request specifying a type or level of authentication;
   with the handler, activating a client modality for obtaining authentication information in a manner consistent with the request, the modality comprising a hardware device in electronic communication with the client device, wherein the remote application lacks permission to communicate with the hardware device;
   with the handler, prompting the user to provide authentication information to the activated modality; and
   electronically communicating the obtained information to the remote application.

6. The method of claim 5, wherein the modality further comprises a window drawn on a display of the client and prompting the user for a password.

7. The method of claim 5, wherein the request specifies the modality.

8. The method of claim 5, wherein the request specifies an authentication level, the activated modality being consistent with the specified level.

9. A system for authenticating a user of a client device executing a remote application, the system comprising:
   a hardware device for obtaining authentication information, wherein the remote application lacks permission to communicate with the hardware device;
   a client device (i) in electronic communication with the hardware device and (ii) comprising a computer processor for executing software instructions of a remote application and of an authorization-request handler, the instructions of the authorization request handler comprising:
   (i) electronically receiving, from the remote application, a request to authenticate the user;
   (ii) prompting the user for authentication information in a manner consistent with the request; and
   (iii) activating and communicating with the hardware device to obtain the authentication information; and
   a database of authentication data to which the authentication information is compared to verify that the user is authorized to use the remote application.

10. The system of claim 9, wherein the remote application compares the authentication information to the database of authentication data.

11. The system of claim 9, further comprising an authorization server for comparing the authentication information to the database of authentication data.

* * * * *